United States Patent [19]

Spraker et al.

[11] 4,149,371

[45] Apr. 17, 1979

[54] AIR SUPPLY CONTROL SYSTEM

[75] Inventors: Wilbur A. Spraker; Kenneth F. Kaiser, both of Indianapolis, Ind.

[73] Assignee: Wallace Murray Corporation, New York, N.Y.

[21] Appl. No.: 832,822

[22] Filed: Sep. 13, 1977

[51] Int. Cl.² .............................................. F02C 9/14
[52] U.S. Cl. .................................. 60/39.07; 60/39.29
[58] Field of Search ............................. 60/39.07, 39.29

[56] References Cited

U.S. PATENT DOCUMENTS

| | | | |
|---|---|---|---|
| 2,618,431 | 11/1952 | Walker | 60/39.07 |
| 2,767,562 | 10/1956 | Hall | 60/39.07 |
| 2,777,301 | 1/1957 | Kuhn | 60/39.07 |
| 2,934,094 | 4/1960 | Szydlowski | 60/39.07 |
| 3,080,712 | 3/1963 | Wood | 60/39.07 |
| 3,659,417 | 5/1972 | Grieb | 60/39.07 |

Primary Examiner—Robert E. Garrett
Attorney, Agent, or Firm—Thomas J. Greer, Jr.

[57] ABSTRACT

An air supply system having a combustor whose output drives a turbine. The turbine drives a compressor part of whose output is fed to the combustor. A portion of the compressor output is bled off for utility usage. Instead of varying the fuel rate to the combustor to match varying demand in utility usage, the fuel rate is fixed. Operation of the system at air flows above and below that corresponding to the fixed fuel rate is accommodated by (1) a poppet relief valve which opens at high pressures and (2) a butterfly valve in the bleed (utility) line which rotates to decrease the bleed flow upon decrease in pressure.

1 Claim, 2 Drawing Figures

① DESIGN CONDITION—
POPPET 26 CLOSED,
BUTTERFLY 28 OPEN.

② MAXIMUM FLOW—
BUTTERFLY 28 ACTUATES
TO LIMIT FLOW TO
MAXIMUM VALUE.

③ MINIMUM FLOW—
POPPET VALVE 26 OPENS

AIR SUPPLY CONTROL SYSTEM

This invention relates to an air supply system of the type including a combustor, a turbine, and a compressor. The output gases of the combustor are fed to the turbine to thus rotate its impeller wheel. Rotation of the turbine impeller wheel is transmitted to a shaft, in turn coupled to the impeller wheel of a compressor. A portion of the output of the compressor (whose input is taken from ambient air) is then fed into the input of the combustor. A bleed line passes from the output of the compressor to a utility usage device, such as a turboconveyor, an air motor, or other device which utilizes a supply of compressed air.

In the usual configuration of an air supply, an oversized compressor is bled to supply the air required for utility usage. Since the amount of air bled may vary from none to the maximum capability of the system, a control system is usually provided. The control system senses either compressor discharge pressure or gas turbine rpm and uses this signal to control fuel flow rate. Such control system, which usually includes electrical components, is often expensive and presents reliability problems.

The present invention overcomes most reliability problems and instead employs a much simpler and more reliable control system. In accordance with the invention, the fuel flow rate is determined at the design point of the system. At the design point, a certain compressor flow rate, bleed air flow rate, and turbine flow rate, all result in a fixed turbine inlet temperature which in turn determines a fixed fuel flow rate. The exact value of each of these parameters depends upon the efficiency and flow characteristics of the particular compressor and turbine employed. In carrying out the invention, the fuel flow rate is maintained at a constant value throughout the operating range of the gas turbine air supply. This is done by controlling the fuel inlet pressure to the fuel nozzle with any known pressure regulating valve.

Examination of the "off-design point" performance characteristics of such a system reveals that if bleed air flow to the system load (utility usage) decreases below the design point value, the turbine inlet temperature decreases, the turbocharger rpm increases, and the pressure of the bleed air increases. In a typical system designed for a bleed air pressure ratio of 2 to 1 and 36 lbs. per minute of bleed air flow rate, decreasing the bleed air flow rate to 18 lbs. per minute results in a bleed air pressure ratio of approximately 3 to 1 and an increase in speed from approximately 60,000 rpm to approximately 90,000 rpm. The increase in speed and pressure ratio is acceptable from the standpoint of the turbomachinery but is sometimes unacceptable from the standpoint of the system to which bleed air is being supplied, since the higher bleed air pressure might exceed the pressure capability of the system. This problem is overcome by a simple pressure actuated poppet valve, according to this invention, which opens at a pressure ratio of approximately 2.5 to 1 and thus maintains the bleed air flow rate at a sufficiently high value that excessive bleed air pressure is not developed.

At the other end or portion of the system operating range, being that portion in which bleed air flow rate is greater than the design bleed air flow rate as a result of decreased pressure drop in the system being supplied, the increase in bleed air flow rate will result in the gas turbine slowing down, the turbine air flow rate decreasing and the turbine inlet temperature increasing to unacceptably high values. This characteristic presents a problem from the standpoint of excessively high turbine inlet temperatures, and could present a problem of unacceptably low pressure to the utility system being supplied. According to this invention, a butterfly valve is installed in the bleed air line. The butterfly valve is connected to a diaphram or any other conventional pressure actuated control. During normal operation the butterfly valve is wide open and has little or no effect on the performance of the system. However, if the bleed pressure decreased to, for example, 3 to 4 pounds below the normal discharge pressure of 15 PSI gage (for example), the butterfly valve partially closes and modulates to maintain the bleed air pressure supplied by the compressor and thus limit the bleed air flow rate.

Figure 1:
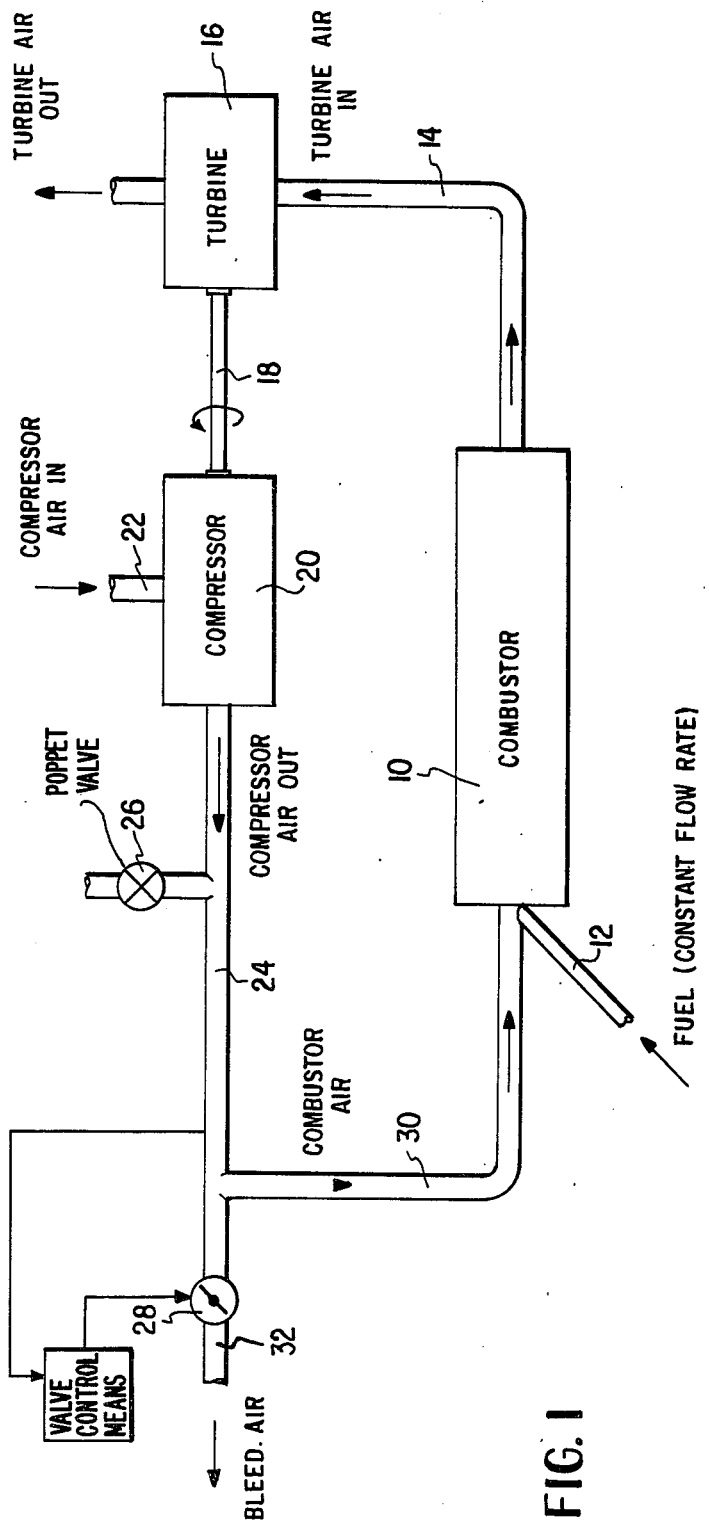
FIG. 1 is a partially schematic view illustrating the system of this invention.

Referring now to FIG. 1 of the drawings, the numeral 10 denotes a combustor of conventional construction which includes an inlet flow line 12 which supplies fuel to the combustor 10. The fuel combines with air or oxygen continuously fed to the combustor to produce an output defined by a high temperature and pressure gas flow in output line 14. This high temperature and pressure gas flow is fed to the input of turbine 16. The impeller wheel is coupled to shaft 18 and by its rotation causes rotation of the impeller wheel in compressor 20. Ambient air feeding in through line 22 is thus compressed and fed out through line 24. A pressure actuated poppet valve 26, of any conventional construction, (which may be termed a first valve) is placed as indicated in line 24. Bleed line 32 includes a butterfly (which may be termed a second valve) valve 28 whose degree of opening is controlled by a control means responsive to the pressure in line 24. Such pressure control valves are well known and any conventional construction may be employed. Air from bleed line 32 is fed to a utility usage device such as an air motor for driving a turboconveyor, an air pump, or any such device. Line 24 also communicates with combustor input line 30.

Figure 2:
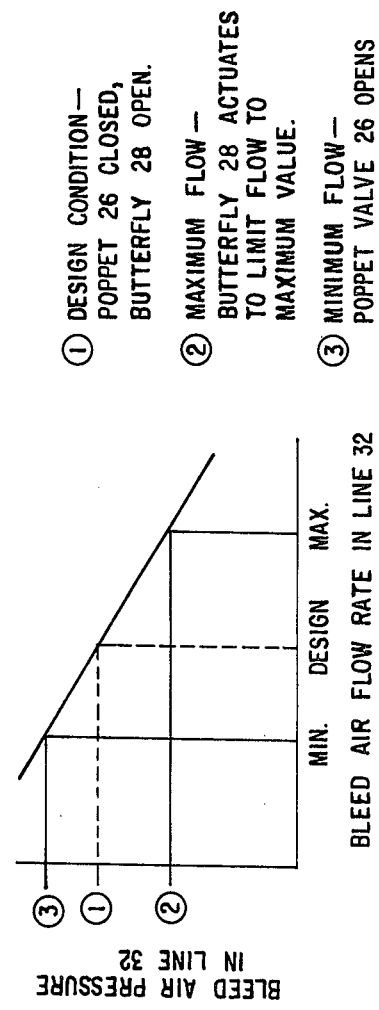
FIG. 2 is a graph illustrating the operation of the system of FIG. 1.

The operation of the system of FIG. 1 will now be described with particular regard to FIG. 2. The design point is schematically indicated by the numeral 1 FIG. 2. The design point corresponds to a plurality of parameters such as input turbine temperature, temperature in line 14, pressure in line 24, fuel flow rate in line 12, etc. The design point may be considered as one point in a space of several dimensions. At and near the design point, the butterfly valve 28 is fully open and the pressure release poppet valve 26 is closed. When the bleed air flow rate in line 32 increases to a certain predetermined value, such value is sensed by measuring the pressure in line 24 or line 30 by conventional means and causes valve 28 to close somewhat and to thereby limit the flow in line 32 to a value not greater than the predetermined maximum value. When the flow rate in line 32 decreases and approaches the minimum predetermined flow rate, the pressure therein will be a maximum and relief valve 26 will open to thereby maintain the pressure in line 32 below the predetermined maximum value. The reader will understand that the pressure may be sensed either in line 30 or in line 24 since the pressure is substantially the same in both lines.

From the above explanation the reader will now understand that this system exhibits great reliability. All components of the system are readily available and may be selected from a wide variety of types and styles, it being only necessary to match them to accommodate the desired design point of operation.

The following U.S. Pat. Nos. disclose somewhat similar control systems: 2,275,543 to Meyer; 2,354,213 to Jendrassik; 3,584,459 to Amann; 3,691,762 to Ryberg; 3,727,400 to Harrison; 3,486,979 to Pfefferele; 3,902,316 to Huellmantel; 3,909,152 to Rannenberg; and 3,949,549 to Holl. What is claimed is:

1. An air supply system including an air compressor coupled to and rotatably driven by a turbine, a combustor whose gaseous output is coupled to and drives the turbine, the compressor feeding an output line to the input of the combustor, a bleed line leading from the compressor output line, the bleed line adapted to feed compressed air to an external system requiring a pressurized air supply, a fuel line coupled to and adapted to supply a constant rate of fuel for burning to the combustor, the improvement comprising, a first valve, said first valve being a pressure relief valve in the compressor output line, said pressure relief valve being coupled to and controlled by the pressure in said compressor output line, a second valve, said second valve being in the bleed line, said second valve being of the type controlled by pressure, control means responsive to the pressure in the compressor output line, said control means controlling the second valve whereby the fuel flow to the combustor can be set to a constant, predetermined value to thereby establish a normal operating air output pressure in the compressor output line and in the bleed line, and whereby the second valve, being the valve in the bleed line operates towards its closed position to maintain pressure in the output line above a predetermined minimum pressure, and whereby the first valve opens to maintain pressure in the output line below a predetermined maximum pressure.

* * * * *